United States Patent
Schreck

(10) Patent No.: US 7,249,945 B2
(45) Date of Patent: Jul. 31, 2007

(54) DEVICE FOR OPENING AND CLOSING INJECTION NOZZLES IN AN INJECTION MOULDING TOOL

(75) Inventor: Hans Schreck, Burgwald-Bottendorf (DE)

(73) Assignee: Heitec-Heisskanaltechnik GmbH, Burgwald-Bottendorf (DE)

( * ) Notice: Subject to any disclaimer, the term of this patent is extended or adjusted under 35 U.S.C. 154(b) by 199 days.

(21) Appl. No.: 10/671,345

(22) Filed: Sep. 25, 2003

(65) Prior Publication Data
US 2004/0076710 A1 Apr. 22, 2004

(30) Foreign Application Priority Data
Oct. 18, 2002 (DE) ............ 202 16 125 U

(51) Int. Cl.
*B29C 45/23* (2006.01)
(52) U.S. Cl. ...................... 425/564; 425/566
(58) Field of Classification Search .......... 425/562, 425/563, 564, 565, 566, 549, 569
See application file for complete search history.

(56) References Cited
U.S. PATENT DOCUMENTS

| | | | | |
|---|---|---|---|---|
| 3,671,159 | A * | 6/1972 | Greenberg et al. .......... | 425/573 |
| 4,378,963 | A | 4/1983 | Schouenberg | |
| 4,747,770 | A * | 5/1988 | Schmidt ..................... | 425/549 |
| 2003/0091684 | A1* | 5/2003 | Hefner ...................... | 425/549 |

FOREIGN PATENT DOCUMENTS

| | | |
|---|---|---|
| DE | 43 24 275 C2 | 5/1996 |
| DE | 38 33 220 C2 | 4/1998 |
| DE | 199 20 331 A1 | 11/2000 |
| EP | 0 818 295 A1 | 1/1998 |
| JP | 2000-343560 | 12/2000 |

OTHER PUBLICATIONS

Patent Abstracts of Japan—Pub. No. 06-126412, May 10, 1994.
Patent Abstracts of Japan—Pub. No. 07-125015, May 16, 1995.

* cited by examiner

*Primary Examiner*—Tim Heitbrink
(74) *Attorney, Agent, or Firm*—Flynn, Thiel, Boutell & Tanis, P.C.

(57) ABSTRACT

A device for opening and closing injection nozzles in an injection moulding tool. The injection nozzle comprises a nozzle member, the nozzle opening of which can be opened and closed with a needle. The needle is stationarily arranged on a piston plate that is supported in a receptacle such that it can be moved in both axial directions similar to a double-action cylinder. A first work chamber is formed on the side of the piston plate which faces away from the needle and a second work chamber that can be acted upon with a fluid in order to actuate the needle is formed on the opposite side of the piston plate. The needle extends outward from the second work chamber through a recess in an end element that lies opposite of the piston plate. In this case, the second work chamber is sealed in an essentially fluid-tight fashion by means of a first sealing element that is arranged between the inner wall of the receptacle and the piston plate and a second sealing element that is arranged between the wall of the recess and the needle and comes in direct contact with the needle.

18 Claims, 2 Drawing Sheets

STATE OF THE ART

DETAIL X

DEVICE FOR OPENING AND CLOSING INJECTION NOZZLES IN AN INJECTION MOULDING TOOL

FIELD OF THE INVENTION

The invention pertains to a device for opening and closing injection nozzles in an injection moulding tool, wherein the injection nozzle comprises a nozzle member, the nozzle opening of which can be opened and closed with a needle.

BACKGROUND OF THE INVENTION

For example, devices of the type in question are, although not exclusively, utilized in so-called hot runner moulds, in which the moulding mass to be processed is injected into the mould cavity in a timed fashion via heated channels, valves and nozzles. In this case, the injection nozzles are typically realized in the form of needle valves or needle-type nozzles, in which the point of a needle is pressed against a seat in the nozzle member which is realized complementary with respect to the shape and function of the needle in order to close the nozzle and lifted off said seat in order to open the nozzle.

In one known device, the needle is stationarily arranged on a piston plate that is supported in a receptacle such that it can be displaced in both axial directions similar to a double-action cylinder, wherein a first work chamber is formed on the side of the piston plate which faces away from the needle and a second work chamber is formed on the opposite side of the piston plate, wherein the second work chamber can be acted upon with a fluid in order to actuate the needle, and wherein the needle extends outward from the second work chamber through a recess in an end element that lies opposite of the piston plate. One disadvantage of this known device can be seen in the fact that the piston plate has a comparatively large mass. If several needles are provided, the constructive design also results in a comparatively large spacing between the needles or injection nozzles.

Based on this state of the art, the invention aims to develop a device of the previously described type which has smaller moving masses and makes it possible to achieve a small spacing between adjacent needles and consequently several injection nozzles per surface unit.

SUMMARY OF THE INVENTION

The device according to the invention for opening and closing injection nozzles in an injection moulding tool conventionally comprises a needle for opening and closing the nozzle opening of an injection nozzle. In this case, the needle is stationarily arranged on a piston plate that is supported in a receptacle such that it can be displaced in both axial directions similar to a double-action cylinder. A first work chamber is formed on the side of the piston plate which faces away from the needle, and a second work chamber is formed on the opposite side of the piston plate. The second work chamber can be acted upon with a fluid, for example pneumatically or hydraulically, in order to actuate the needle. The needle extends outward from the second work chamber through a recess in an end element that lies opposite of the piston plate.

According to the invention and in contrast to devices known from the state of the art, the second work chamber is closed in an essentially fluid-tight fashion by means of a first sealing element that is arranged between the inner wall of the receptacle and the piston plate and a second sealing element that is arranged between the wall of the recess and the needle and comes in direct contact with the needle. In devices according to the state of the art, the second work chamber is completely sealed by means of sealing elements arranged between the receptacle or recess and the piston plate. In the device according to the invention, the second work chamber is outwardly closed by directly sealing the recess relative to the needle. This not only makes it possible to reduce the mass of the piston plate, but also to arrange several needles closely adjacent to one another on a piston plate. This results in lighter, smaller and less expensive tools and makes it possible to realize a very tight spacing of the injection nozzles and consequently the mould cavities.

According to one embodiment of the invention, the device comprises a base plate, an end plate and a cylinder plate arranged between the base plate and the end plate. The receptacle for the piston plate is arranged in the cylinder plate; depending on the respective requirements, several receptacles for several piston plates may be arranged adjacent to one another in a cylinder plate. The base plate closes the receptacle, i.e., the interior of the cylinder, and forms the first work chamber, wherein the term "cylinder" not only refers to regular cylinders or rotationally symmetrical geometries. The end plate seals the receptacle, i.e., the interior of the cylinder, and forms the second work chamber. This makes it possible to achieve a simple and inexpensive structural design of the device according to the invention.

Since a sufficient sealing effect can usually not be achieved in the connection between the base plate and the cylinder plate due to manufacturing tolerances, an essentially closed peripheral sealing element, for example in the form of an O-ring, is preferably arranged around the receptacle between the base plate and the cylinder. This seal is compressed when the base plate and the cylinder plate are screwed together.

An essentially closed peripheral sealing element may, in principle, be analogously arranged around the receptacle between the cylinder plate and the end plate.

According to another embodiment, the line for the inflow and the outflow of the fluid extends in the base plate and ends in the receptacle or, in particular, directly in the first work chamber.

Analogously, the line for the inflow and outflow of the fluid may be arranged in the end plate and end in the receptacle or, in particular, directly in the second work chamber.

It is preferred that the piston plate essentially has the shape of a circular disk, and that the recess is realized complementary thereto in the form of a regular cylinder.

In order to achieve a reliable fluidic separation between the two work chambers, the piston plate is conventionally provided with an essentially closed peripheral recess in the region of its outer circumferential surface, wherein the first sealing element is arranged in this recess. The first sealing element is preferably realized in the form of an O-ring or an annular lip seal.

The second sealing element between the recess in the end plate and the needle may, in principle, be chosen arbitrarily as long as a sufficient sealing effect is provided. The second sealing element preferably is also realized in the form of an O-ring or an annular lip seal.

In order to prevent tilting, in particular, when using thinner or larger piston plates and/or to ensure a reliable radial positioning of long needles, a guide element for guiding the needle is provided in addition to the second sealing element in the recess of the end element or the end plate in another embodiment of the invention. This guide element may, for example, be realized in the form of a radial ball bearing. However, the guide element is preferably realized in the form of, in particular, a bushing-shaped radial sliding bearing.

In order to prevent the second sealing element or the guide element from unintentionally loosening, a fixing element is provided in another embodiment of the invention, wherein said fixing element makes it possible to fix the second sealing element and/or the guide element, in particular, in a prestressed fashion. The sealing effect can be ensured or at least improved due to this prestress that, for example, is achieved by compressing a sealing element in the form of an O-ring.

The fixing element may, for example, simply consist of a Seeger circlip ring or a snap ring. However, the fixing element is preferably realized in the form of a stud screw that can be screwed into an inside thread arranged in the recess, wherein the fixing element contains an axially continuous recess, through which the needle is able to extend with at least slight radial play. A simple installation is achieved in this fashion.

The advantages of the invention, in particular, with respect to the smaller moving masses can, in principle, already be achieved with a piston plate that only contents a single needle. However, it is preferred to arrange at least two or more needles on a piston plate.

BRIEF DESCRIPTION OF THE DRAWINGS

The invention is described in greater detail below with reference to the embodiments that are illustrated in the figures. The figures show.

DETAILED DESCRIPTION

Figure 1:
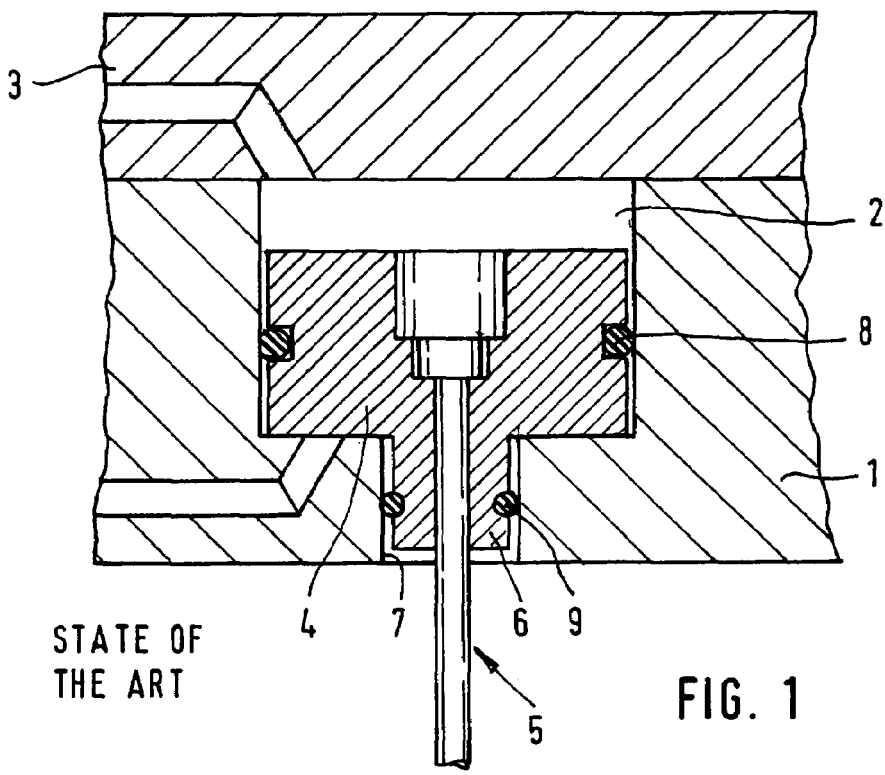
FIG. 1 a schematic vertical section through a device according to the state of the art.

FIG. 1 shows a device according to the state of the art. This known device comprises a base plate 1, in which a cylindrical receptacle 2 is arranged. The end face of the receptacle 2 is closed with a plate 3. A piston plate 4 is arranged in the receptacle 2 such that it can be axially moved in the receptacle 2. A needle 5 is arranged on the piston plate 4 in such a way that the head of the needle 5 is fixed in a recess of the piston plate. The piston plate contains a shoulder 6 that is guided in a recess 7 of the base plate. The second work chamber that has reached its minimum in FIG. 1 is sealed by means of a sealing element 8 on the top and by means of a sealing element 9 on the bottom. Due to the shoulder 6, the piston plate has a comparatively large mass; in addition, the spacing between several adjacently arranged needles needs to be comparatively large.

Figure 2:
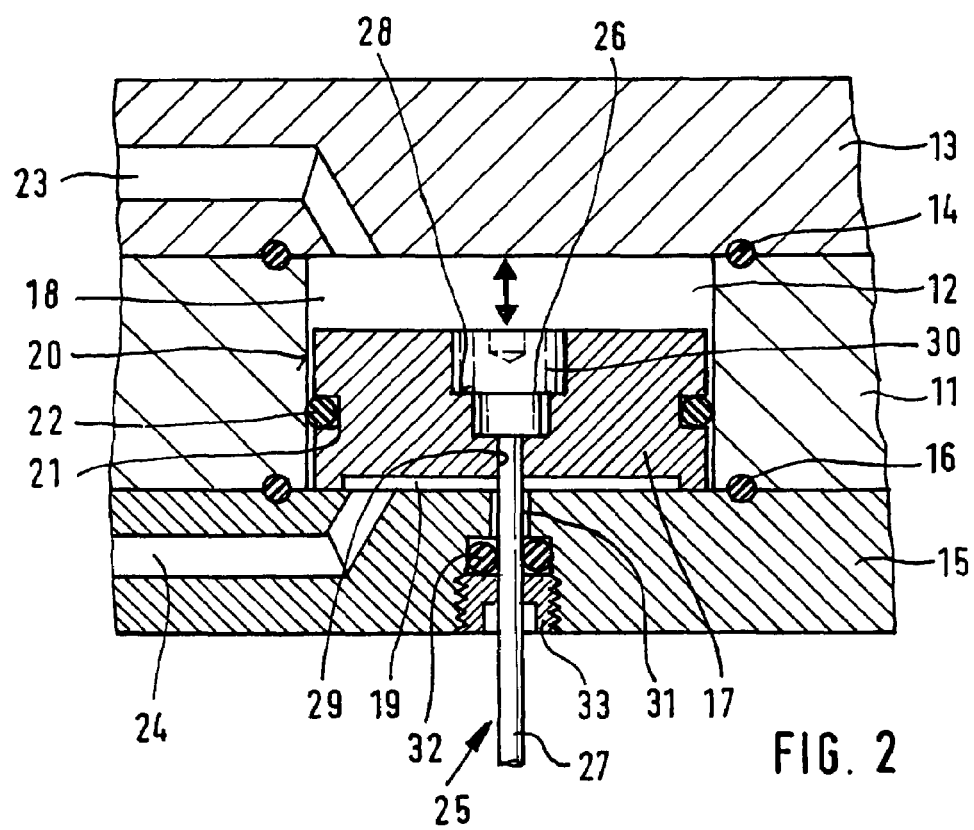
FIG. 2 a first embodiment of a device according to the invention in the form of a representation that corresponds to FIG. 1.

The first embodiment of the device according to the invention which is illustrated in FIG. 2 comprises a cylinder plate 11, in which a continuous cylindrical receptacle 12 is arranged. A base plate 13 is arranged on the cylinder plate 11 and fixed thereon by means of not-shown screws. A sealing element 14 in the form of an O-ring is arranged between the base plate 13 and the cylinder plate 11, wherein said sealing element continuously extends around the periphery of the opening in the end face of the receptacle 12 which points to the base plate 13. The O-ring is compressed when the base plate 13 and the cylinder plate 11 are screwed together such that the two plates are sealed relative to one another, i.e., the receptacle 12 is outwardly sealed.

An end plate 15 is similarly arranged on the cylinder plate 11 opposite of the base plate 13. The seal between the cylinder plate 11 and the end plate is also realized with a sealing element 16 in the form of an O-ring.

A piston plate 17 is arranged in the receptacle 12 of the cylinder plate 11 such that it can be axially moved. The piston plate 17 divides the receptacle 12 into a first work chamber 18 and a second work chamber 19. In the region of its outer circumferential surface 20, the piston plate 17 is provided with a peripheral groove 21, in which a first sealing element 22 in the form of a closed peripheral O-ring is arranged. This ensures the free axial mobility of the piston plate, as well as a fluid-tight separation of the two work chambers 18 and 19.

In addition, one respective line 23 and 24 is arranged in the base plate 13 and in the end plate 15, wherein said lines serve for the inflow and the outflow of the actuating fluid, for example compressed air or hydraulic oil, into/from the work chambers 18 and 19. This makes it possible to conventionally move the piston plate 17 back and forward or up and down in the receptacle 12 similar to a double-action cylinder.

A needle 25 is arranged on the piston plate 17. The needle has a collar-like head 26 and an essentially cylindrical shaft 27. The head 26 is situated in a shoulder-like depression 28 of the base plate 17; the shaft 27 of the needle 25 extends through a recess 29 in the piston plate 17. The needle is stationarily fixed on the piston plate 17 by means of a hexagon socket screw 30 such that it follows the movement of the piston plate 17.

The shaft 27 of the needle 25 also extends through a continuous recess 31 in the end plate 15 with slight radial play. A second sealing element 32 in the form of an O-ring is inserted into a step-like shoulder of the recess 31 and fixed therein, in particular with a prestress, by means of a fixing screw 33 that is realized similar to a stud screw and contains an axially continuous recess, through which the entire shaft 27 of the needle 25 extends. This means that the sealing element 32 which directly adjoins the needles 25 outwardly seals the second work chamber 19 in a fluid-tight fashion while simultaneously ensuring the free axial mobility of the needle 25.

Figure 3:
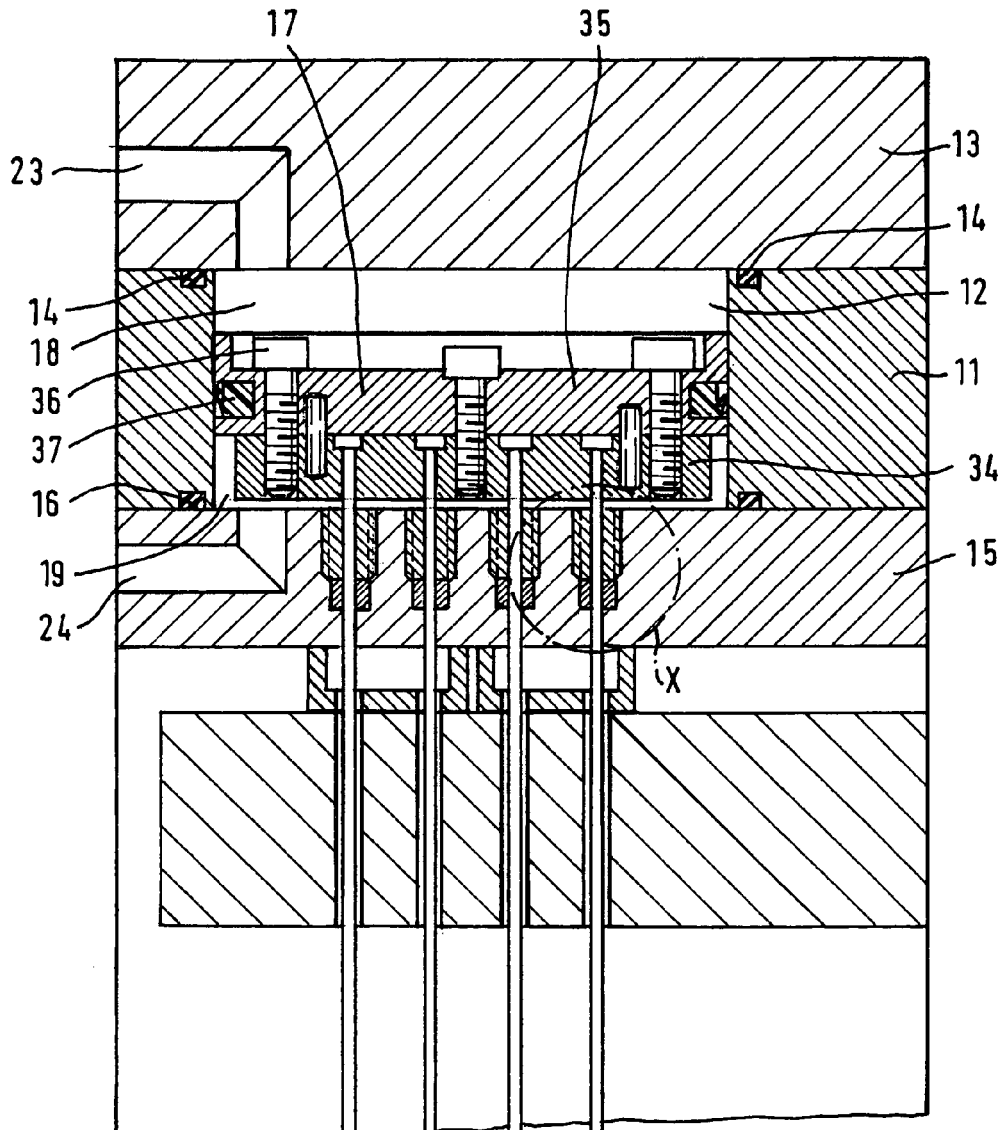
FIG. 3 a second embodiment of the device according to the invention, namely also in the form of a schematic sectional representation, and FIG. 4 an enlarged representation of the detail X in FIG. 3.

The embodiment shown in FIG. 3 has, in principle, the same structural design comprising a base plate 13, a cylinder plate 11 and an end plate 15. In contrast to the embodiment according to FIG. 2, four needles 25 are arranged adjacent to one another on the piston plate 17 that is guided in the receptacle 12 in an axially movable fashion.

The piston plate of this embodiment consists of two parts, namely a base plate 34, in which the needles 25 are arranged in exactly the same fashion as in the previously described embodiment, and a mounting plate 35. The needles 25 are stationarily fixed in this embodiment by means of the mounting plate 35 that is mounted on the base plate 34 with screws 36.

In this case, the piston plate is sealed and a fluid-tight separation between the two work chambers 18 and 19 is achieved by means of an annular lip seal 37 that is arranged in a groove in the circumferential surface of the mounting plate 35.

Figure 4:
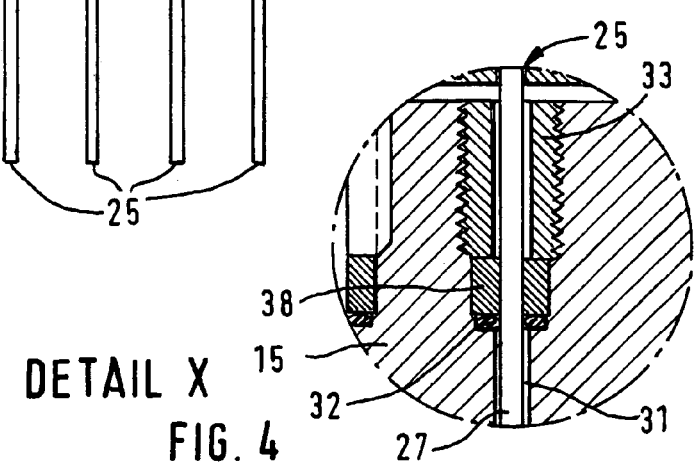

The sealed lead-through of the needles 25 through the end plate of this embodiment is illustrated in FIG. 4 that shows an enlarged representation of the detail X in FIG. 3.

The end plate 15 contains a continuous recess 31 for each needle 25. The recess 31 narrows in a step-like fashion in the direction of the piston plate, wherein the region with the smallest diameter still has an at least slight radial play referred to the shaft 27 of the needle 25. Similar to the previously described embodiment, a second sealing element 32 in the form of an O-ring is arranged in the recess 31 and compressed by means of a fixing screw 33 that is realized similar to a stud screw. In contrast to the embodiment according to FIG. 2, a bushing-shaped radial sliding bearing 38 is arranged in the recess 31 between the fixing screw 33 and the O-ring 32 in order to reliably guide the needle 25 while simultaneously ensuring its axial mobility.

The invention claimed is:

1. In a device for opening and closing injection nozzles in a hot runner mould, wherein the injection nozzle comprises a nozzle member, the nozzle opening of which can be opened and closed with a needle, wherein the needle is stationarily arranged on a piston plate that is supported in a receptacle such that it can be moved in both axial directions similar to a double-action cylinder, wherein a first work chamber is formed on the side of the piston plate which faces away from the needle and a second work chamber that can be acted upon with a fluid in order to actuate the needle is formed on the opposite side of the piston plate, and wherein the needle extends outward from the second work chamber through a recess in an end element that lies opposite of the piston plate, the improvement wherein the second work chamber is sealed in an essentially fluid-tight fashion by means of a first sealing element that is arranged between the inner wall of the receptacle and the piston plate and a second sealing element that is arranged between the wall of the recess and the needle and comes in direct contact with the needle, wherein a guide element for guiding the needle is arranged in the recess of the end element.

2. The device according to claim 1, wherein it comprises a base plate, an end plate and a cylinder plate that is arranged between the base plate and the end plate, wherein the receptacle for the piston plate is arranged in the cylinder plate, wherein the base plate seals the receptacle and forms the first work chamber, and wherein the end plate seals the receptacle and forms the second work chamber.

3. The device according to claim 2, wherein an essentially closed peripheral sealing element is arranged around the receptacle between the base plate and the cylinder plate.

4. The device according to claim 2, wherein the base plate contains a line that serves for the inflow and the outflow of the fluid and ends in the receptacle.

5. The device according to claim 2, wherein an essentially closed peripheral sealing element is arranged around the receptacle between the cylinder plate and the end plate.

6. The device according to claim 2, wherein the end plate contains a line that serves for the inflow and the outflow of the fluid and ends in the receptacle.

7. The device according to claim 1, wherein the piston plate essentially has the shape of a circular disk, and in that the recess is realized complementary thereto in the form of a regular cylinder.

8. The device according to claim 1, wherein the piston plate is provided with an essentially closed peripheral recess in the region of its outer circumferential surface, wherein the first sealing element is arranged in this recess.

9. The device according to claim 1, wherein the first sealing element is realized in the form of an O-ring or an annular lip seal.

10. The device according to claim 1, wherein the second sealing element is realized in the form of an O-ring or an annular lip seal.

11. The device according to claim 1, wherein the guide element is realized in the form of a bushing-shaped radial sliding bearing.

12. The device according to claim 1, wherein a fixing element is provided for fixing the second sealing element and/or the guide element.

13. The device according to claim 1, wherein the fixing element can be screwed into the recess and contains an axially continuous recess, through which the needle extends with at least slight radial play.

14. The device according to claim 1, wherein at least two needles are arranged on a piston plate.

15. A device for opening and closing an injection nozzle in an injection moulding tool, the injection nozzle comprising a nozzle member having an opening that is opened and closed with a needle, the needle being fixed on a piston plate that is supported in a receptacle such that it can be moved axially as a double-action cylinder having a first work chamber formed on the side of the piston plate which faces away from the needle and a second work chamber on an opposing side of the piston plate, the needle extending outward from the second work chamber through a recess in an end element of the receptacle, the second work chamber being sealed by a first sealing element that is arranged between a side wall of the receptacle and the piston plate and a second sealing element that is arranged between the wall of the recess and the needle, the needle being further guided in the recess by a guide element arranged in the recess.

16. The device according to claim 15, wherein the guide element comprises a bushing-shaped radial sliding bearing.

17. The device according to claim 15, wherein the guide element is positioned between the receptacle and the second sealing element.

18. The device according to claim 15, wherein the second sealing element forms a seal against the wall of the recess and against the needle.

* * * * *